US009957896B2

(12) United States Patent
Belmonte et al.

(10) Patent No.: US 9,957,896 B2
(45) Date of Patent: May 1, 2018

(54) UNLOCKABLE DEVICE FOR AXIALLY ARRESTING A SEALING RING WITH WHICH AN AIRCRAFT TURBOMACHINE MODULE ROTOR WHEEL MAKES CONTACT

(71) Applicant: SNECMA, Paris (FR)

(72) Inventors: Olivier Belmonte, Perthes en Gatinais (FR); Sebastien Jean Laurent Prestel, Arpajon (FR)

(73) Assignee: SNECMA, Paris (FR)

( * ) Notice: Subject to any disclaimer, the term of this patent is extended or adjusted under 35 U.S.C. 154(b) by 1002 days.

(21) Appl. No.: 14/361,954

(22) PCT Filed: Dec. 4, 2012

(86) PCT No.: PCT/FR2012/052788
§ 371 (c)(1),
(2) Date: May 30, 2014

(87) PCT Pub. No.: WO2013/083905
PCT Pub. Date: Jun. 13, 2013

(65) Prior Publication Data
US 2014/0341722 A1   Nov. 20, 2014

(30) Foreign Application Priority Data

Dec. 6, 2011   (FR) ...................................... 11 61233

(51) Int. Cl.
*F01D 11/08*   (2006.01)
*F02C 7/20*   (2006.01)
(Continued)

(52) U.S. Cl.
CPC .............. *F02C 7/20* (2013.01); *F01D 11/122* (2013.01); *F01D 25/246* (2013.01); *F01D 25/28* (2013.01);
(Continued)

(58) Field of Classification Search
CPC .... F02C 7/20; F02C 7/28; F01D 11/08; F01D 11/122; F01D 25/28; F01D 25/246; F05D 2240/11; F05D 2240/14
See application file for complete search history.

(56) References Cited

U.S. PATENT DOCUMENTS 4,295,787 A   10/1981   Lardellier
6,062,813 A   5/2000   Halliwell et al.
(Continued)

FOREIGN PATENT DOCUMENTS

EP   0 017 546   10/1980
EP   0 844 369   5/1998
(Continued)

OTHER PUBLICATIONS

International Search Report dated Apr. 3, 2013 in PCT/FR12/052788 Filed Dec. 4, 2012.
(Continued)

*Primary Examiner* — Woody Lee, Jr.
*Assistant Examiner* — Maxime Adjagbe
(74) *Attorney, Agent, or Firm* — Oblon, McClelland, Maier & Neustadt, L.L.P.

(57) ABSTRACT

A device for axially arresting a sealing ring made of an abradable material in contact with a periphery of an aircraft turbomachine module rotor, the device having a first reference central axis, and including: a support including a support opening defining a circular track centered on a second axis at a distance from the axis; and an axial stop part including an extraction passage centered on a third axis at a distance from the axis, and defining a complementary circular track around its periphery, cooperating with the track to allow the part to rotate about the axis, between an axial stop position for the sealing ring, and a position to extract the ring through the extraction passage.

10 Claims, 7 Drawing Sheets

(51) Int. Cl.
*F01D 11/12* (2006.01)
*F01D 25/24* (2006.01)
*F01D 25/28* (2006.01)
*F02C 7/28* (2006.01)

(52) U.S. Cl.
CPC .......... *F02C 7/28* (2013.01); *F05D 2230/644* (2013.01); *F05D 2240/11* (2013.01); *F05D 2240/14* (2013.01); *F05D 2250/312* (2013.01); *F05D 2250/35* (2013.01); *F05D 2250/70* (2013.01); *F05D 2260/30* (2013.01)

(56) References Cited

U.S. PATENT DOCUMENTS

| | | |
|---|---|---|
| 6,126,390 A | 10/2000 | Boeck |
| 6,435,820 B1 | 8/2002 | Overberg |
| 7,789,619 B2 * | 9/2010 | Durand ................ F01D 11/122 415/173.1 |
| 2007/0231127 A1 | 10/2007 | Durand et al. |
| 2009/0110545 A1 | 4/2009 | Davis et al. |
| 2011/0223008 A1 | 9/2011 | Belmonte et al. |

FOREIGN PATENT DOCUMENTS

| | | |
|---|---|---|
| EP | 1 079 076 | 2/2001 |
| EP | 1 840 339 | 10/2007 |
| EP | 2 055 899 | 5/2009 |

OTHER PUBLICATIONS

U.S. Appl. No. 13/131,500, filed Sep. 15, 2011, 2011-0223008, Belmonte, et al.
U.S. Appl. No. 14/208,485, filed Mar. 13, 2014, Belmonte, et al.
U.S. Appl. No. 14/414,343, filed Jan. 12, 2015, Belmonte, et al.

* cited by examiner

UNLOCKABLE DEVICE FOR AXIALLY ARRESTING A SEALING RING WITH WHICH AN AIRCRAFT TURBOMACHINE MODULE ROTOR WHEEL MAKES CONTACT

TECHNICAL FIELD

The invention relates to a device for axially arresting a sealing ring made of an abradable material that will come into contact with the periphery of an aircraft turbomachine module rotor.

The invention relates more particularly to an axially arresting device for the sealing ring of a first stage of a turbomachine module, preferably a low pressure turbine.

The invention applies to all types of aircraft turbomachines, particularly turbojets and turbo-props.

STATE OF PRIOR ART

In an aircraft turbomachine module, particularly a low pressure turbine, the rotors are alternated with fixed bladed wheels, called guide vanes. A sealing ring made of an abradable material is arranged around each rotor that makes contact with this ring through peripheral "lip seal" elements in order to limit leaks in the main flowpath of the turbomachine.

On existing turbomachines, it must be possible to disassemble some elements so that they can be tested and/or replaced. This is the case particularly for some sealing rings, especially the sealing ring associated with the first rotor of the low pressure turbine. In this case, the segmented ring must be extracted sector by sector, preferably without it being necessary to remove the rotor. Extraction then takes place between the casing and the rotor when possible depending on the space between these two elements.

In conventional solutions according to prior art, the sealing ring of the first rotor of the low pressure turbine is associated with an axial thrust device of the split ring type with a C-shaped section. An annular ring retaining tab and an annular casing retaining tab are both inserted into the hollow part of the C, which is itself in axial bearing with part of the adjacent high pressure turbine.

Thus, to extract the angular ring sectors, the low pressure turbine module has to be removed and then the split ring has to be separated by moving it forwards. Sectors can then be slid through the restricted space delimited between the periphery of the rotor and the casing.

Nevertheless, this solution could be improved in that the restricted space delimited between the rotor and the casing is sometimes too congested to envisage extraction/insertion of angular sealing ring sectors. Furthermore, apart from risk of losing the locking split ring, it should be noted that disassembly and reassembly of the ring has a prejudicial effect on the maintenance time related to these operations.

PRESENTATION OF THE INVENTION

Therefore, the purpose of the invention is to at least partially overcome the disadvantages mentioned above with embodiments according to prior art.

To achieve this, the object of the invention is an axial arresting device for a sealing ring made of an abradable material that will come into contact with the periphery of a rotor of an aircraft turbomachine module, said device having a reference central axis called the first axis.

According to the invention, the device comprises:
a support with a support opening defining a circular track centred on a second axis parallel to said first axis and at a distance from it; and
an axial stop part having an extraction passage centred on a third axis parallel to said second axis and at a distance from it, the stop part defining a complementary circular track around its periphery cooperating with said circular support track to allow said stop part to rotate relative to this support along said second axis, between an axial stop position for the sealing ring and a position to extract this ring through said extraction passage, the distance between the first and third axes being larger in said extraction position than in said axial stop position.

The double eccentricity of the device according to the invention firstly makes it possible to optimise centring of the extraction passage on the first axis that preferably corresponds to the longitudinal axis of the turbomachine in the axial stop position, this centring enabling the axial stop part to be facing and bearing in contact with the sealing ring, preferably around its entire periphery. Secondly, in the extraction position, the extraction passage may be significantly eccentric from the first axis, for example by maximising the two eccentricities of the device. This can release the axial bearing of at least one angular sector of the sealing ring which is then facing part of the extraction passage through which the sectors can be extracted and then reinserted.

The invention provides a simple, easy to implement solution without requiring extraction of the axial arresting device from the turbomachine module concerned, so that this arresting device can be made captive.

Preferably, the distance between said first and second axes is identical to the distance between said second and third axes. Obviously, this is not necessary to remain within the scope of the invention.

Preferably, said extraction passage is generally circular in shape, centred on said third axis. In this respect, the passage may have a repetition of patterns at uniform spacing around its circumferential direction, the patterns then acting as stops for the sealing ring.

Preferably, said support opening has an axial support rim for said axial stop part, said rim running along said circular track and projecting radially inwards from it, and preferably having a notch for extraction of said sealing ring.

Preferably, said support has a festooned periphery centred on said first axis, dedicated to attachment of the support onto a casing of the turbomachine module. This festooned periphery may simultaneously be crossed by means of attaching the casing onto the casing of the adjacent module, or may even include these attachment means directly.

Another object of the invention is an aircraft turbomachine module comprising a casing, a rotor, a sealing ring made of an abradable material in contact with the periphery of the rotor, and an axial arresting device as described above cooperating with said sealing ring.

Preferably, said first axis of the axial arresting device is coincident with a longitudinal axis of the turbomachine module.

Preferably, when in said axial stop position, said sealing ring is in axial bearing around 360° with said axial stop part, and when in said ring extraction position, at least one angular sector of the ring does not have any axial contact with said axial stop part, this angular sector having a radial inner end that is axially facing said extraction passage.

Preferably, said axial stop part is axially squeezed between a flange of the casing and said axial support rim.

Finally, another object of the invention is an aircraft turbomachine comprising at least one module like that described above, said turbomachine preferably comprising means of attachment of said module onto another adjacent module, said attachment means also being used for attachment of the support onto the module casing.

Other advantages and characteristics of the invention will become clear from the detailed non-limitative description given below.

BRIEF DESCRIPTION OF THE DRAWINGS

This description will be made with reference to the appended drawings among which.

DETAILED PRESENTATION OF PREFERRED EMBODIMENTS

Figure 1:
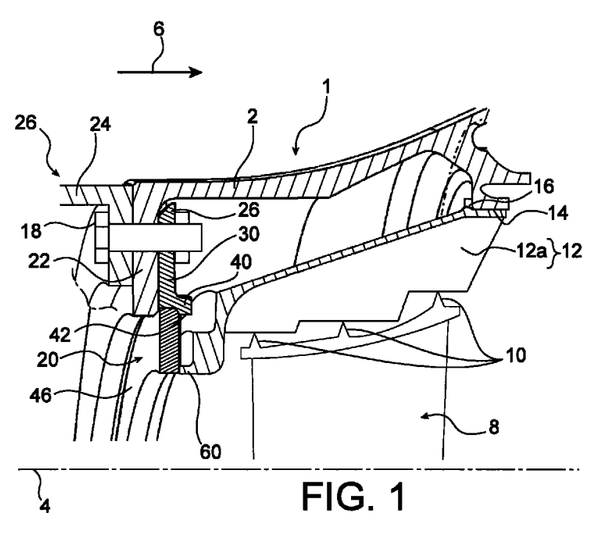
FIG. 1 shows a perspective view of a part of a low pressure turbine of an aircraft turbomachine according to one preferred embodiment of this invention.

FIG. 1 shows a low pressure turbine of an aircraft turbomachine, preferably a turbojet. The turbine 1 comprises an outer casing 2 in a shape of revolution centred about the longitudinal axis 4 of the turbine. The turbine is equipped with rotors and fixed guide vanes alternately along the axial direction. Only the first rotor, the rotor at the inlet side, is shown in FIG. 1.

In this respect, note that throughout the description, the terms "forward" and "aft" are given with reference to the main direction of gas circulation through the turbine, this direction being shown by arrow 6.

The rotor 8 provided with a plurality of blades is centred on the axis 4. Around its periphery, it is provided with lip seals 10 designed to come into contact with a sealing ring 12 made of an abradable material, in a manner known to those skilled in the art. The ring is also called an "abradable ring".

It is made from a plurality of angular ring sectors 12a formed continuous with each other around the circumferential direction. It is in external radial contact with a reaming 14 of the casing 2 and is axially arrested in the downstream direction through a tab 16 formed around the periphery of the ring and bearing in contact with this part of the casing.

At the upstream side, there is a device 20 axially arresting the ring, specific to this invention. This device axially arrests movement of the sealing ring 12 towards the upstream direction. This device is fixed removably, for example by bolts 18 on a flange 22 of the casing 2 that projects radially inwards. This is done by providing the device with a festooned periphery 26 centred on axis 4, with a bolt 18 passing through each projection.

In the preferred embodiment shown, these bolts 18 are used to fasten the flange 22 with a flange 24 of the casing of the adjacent low pressure turbine. The device 20 will now be described in detail with reference to FIGS. 2 to 3.

Figure 2:
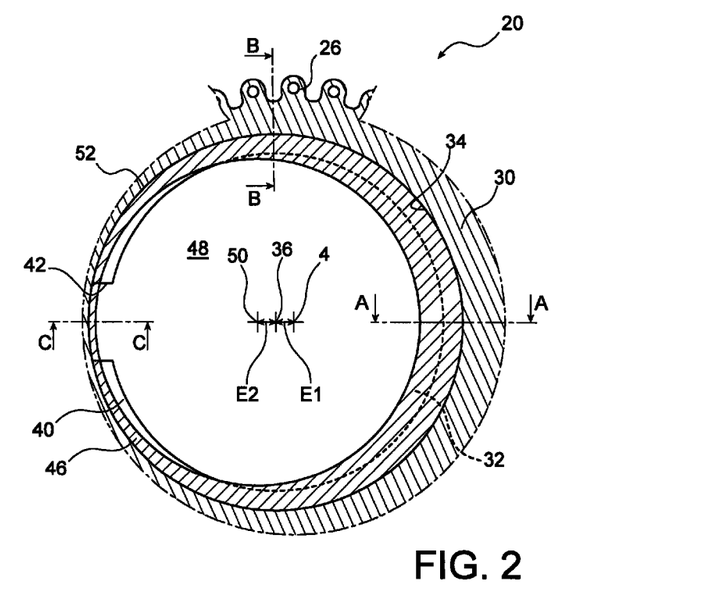
FIG. 2 shows a sectional view of an axial arresting device of a sealing ring of the turbine shown in the previous figure, the axial arresting device being in an extraction position of the ring, this FIG. 2 also corresponding to the sectional view taken along line II-II in FIG. 2A.
Figure 3:
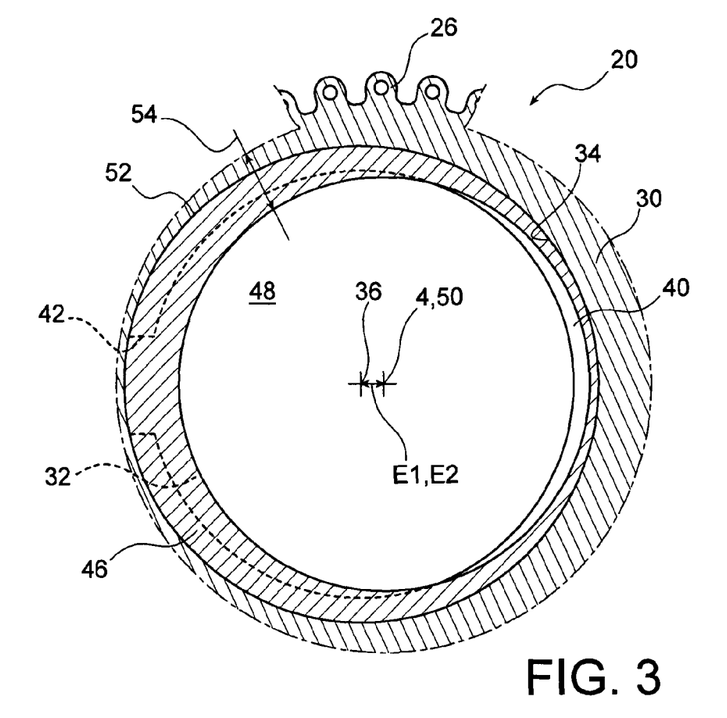
FIG. 3 is a view similar to the view in FIG. 2, with the axial arresting device in an axial arresting position.

Firstly, the device 20 has a support 30 fitted with said festooned periphery 26 centred on the central reference axis of the device corresponding to the axis 4 when the device 20 is installed on the turbine 1. Consequently, this axis will be marked as reference 4, and called the first axis.

The support 30 is provided with a support opening 32 defining a circular track 34 centred on a second axis 36 parallel to the first axis, and at a distance from it equal to a value "E1".

Furthermore, the support opening 32 has a rim 40 running along the circular track 34 and projecting radially inwards from it. The rim 40 has a notch 42 for extraction of the sealing ring, as will be described below.

The function of the rim 40 is to axially support another element of the device 20, namely an axial stop part for the ring, reference 46.

The axial stop part 46 has an extraction passage 48 centred on a third axis 50 parallel to the second axis 36 and at a spacing from it equal to a value "E2" preferably identical to E1.

Furthermore, the part 46 defines a complementary circular track 52 around its periphery cooperating with the circular track 34 of the support 30, and therefore also being centred on the axis 36. Therefore the two tracks 34, 52 have practically the same diameters.

The double eccentricity provided within the device 20 makes it possible to adopt two distinct positions by simple rotation of the stop part 46 around its axis 36 relative to the support 30. These two positions enable unlocking and locking respectively of the axial arresting device 20.

This determines the extraction position of the ring through the extraction passage 48 as shown in FIG. 2, and an axial stop position for the sealing ring as shown in FIG. 3.

Figure 2A:
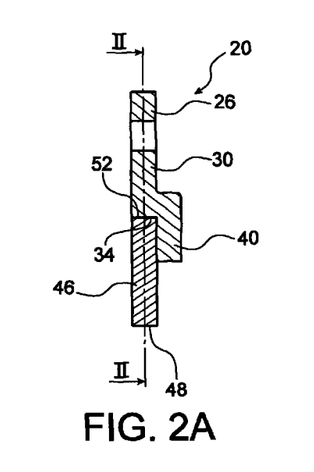
FIGS. 2A, 2B and 2C are sectional views taken along lines A-A, B-B and C-C in FIG. 2 respectively.

In the extraction position, the passage 48 is offset from the axis 4 as far as possible, and the eccentricity value is equal to the sum of the values E1 and E2. Consequently, the thickness of the device 20 in the radial direction is very variable around the circumferential direction. The values of the radial thickness of the support and the radial thickness of the part 46 are maximum on the side diametrically opposite the notch 42. Consequently, the sum of these two radial thicknesses is very large as can be seen in FIG. 2A.

Figure 2B:
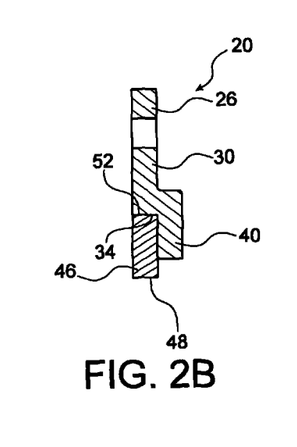
Figure 2C:
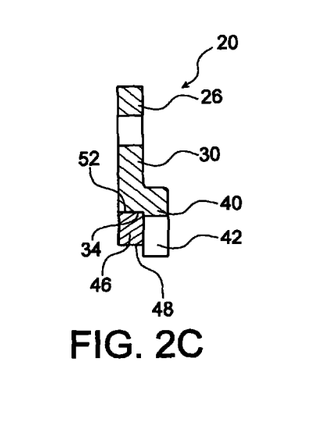

On the other hand, the values of the radial thickness of the support 30 and the radial thickness of the part 46 are minimum on the side of the notch 42. The sum of the two radial thicknesses shown in FIG. 2C is consequently minimal and is much less than the thickness in FIG. 2A. For guidance, FIG. 2B shows the average radial thickness of the device as it is found between the two extreme portions mentioned above.

As will be described below, the radial offset of the extraction passage 48 makes it possible to extract angular ring sectors 12a through the same passage at the eccentric part superposed with the notch 42 of the support rim.

In the radial stop position shown in FIG. 3, the passage 48 is centred on the axis 4, to compensate for the eccentricities E1, E2. Consequently the axes 4 and 50 are coincident, implying zero spacing between them.

Thus, the thickness 54 of the device 20 remains practically the same along the radial direction around the entire circumference. The radial thickness of the support is maximum on the side diametrically opposite the notch 42, while the radial thickness of the part 46 is minimum. The sum of the two radial thicknesses is practically the same as the sum on the side of the notch 42 since the radial thickness of the support 30 is minimum while the radial thickness of the part 46 is maximum.

As will be described below, centering of the extraction passage 48 means that the part 46 forms an axial stop for the ring around the entire length of the ring.

Figure 4:
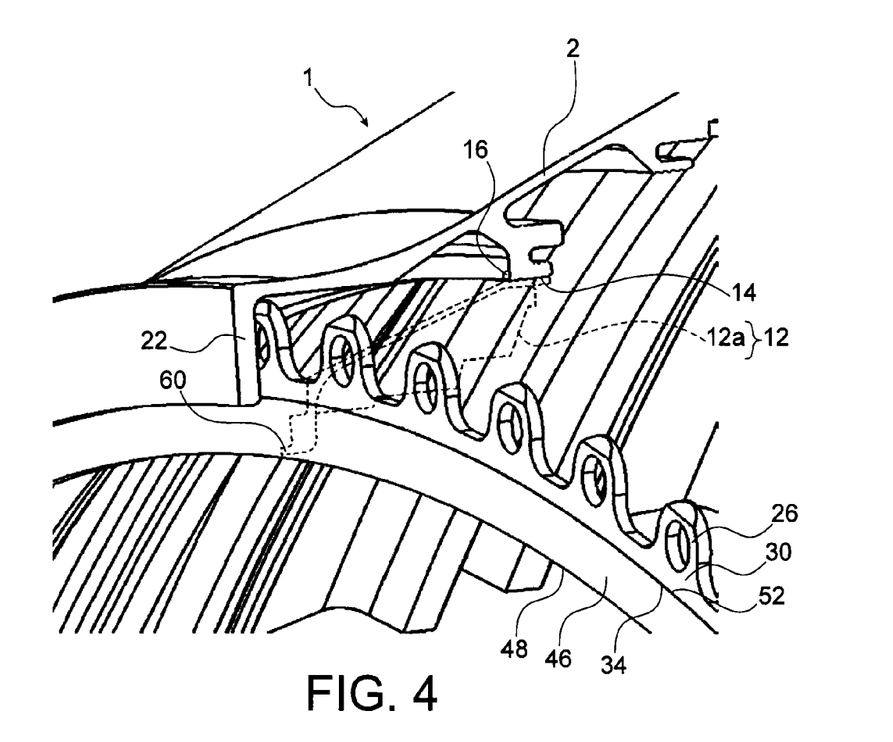
FIG. 4 shows another partial perspective view of the low pressure turbine shown in FIG. 1, some elements cut out for reasons of clarity.
Figure 5:
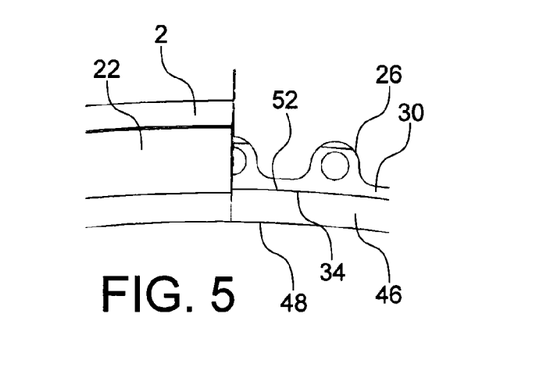
FIG. 5 shows a front view of the view shown in FIG. 4.

With reference to FIGS. 1, 4 and 5, the device 20 can be seen installed on the flange 22 of the casing 2 in the axial stop position in which the sealing ring 12 is axially bearing in contact with the axial stop part 46 around 360°, at a radial inner end of the part. To achieve this, the ring 12 is provided with a bearing tab 60 projecting axially in the upstream direction, and in contact with said radially inner end of the part 46 as can be seen in FIG. 1, and in FIG. 4 in which the ring 12 is shown only diagrammatically.

This is a locked position, also called the active position, in which the device 20 retains the ring 12 in translation. In this position, the festooned periphery 26 of the support 30 is firmly fixed in contact with the flange 22 of the casing 2 on the downstream side, while the part 46 is axially clamped between this flange 22 and the rim 40 of the support 30. This clamping prevents displacement of the stop part 46 during operation of the turbine and in particular prevents its rotation on the track 34.

Figure 6:
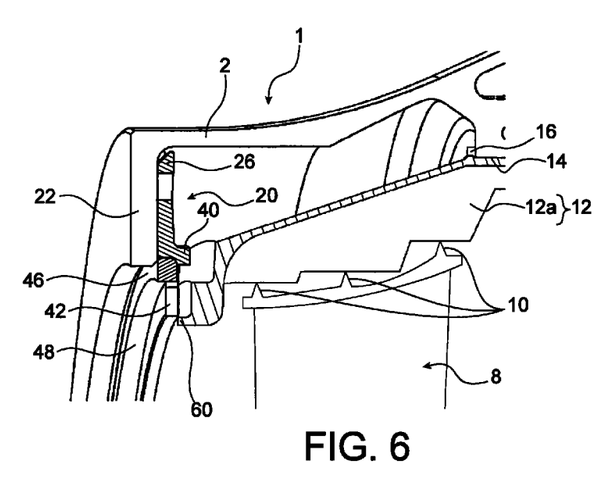
FIG. 6 shows a view similar to that in FIG. 1, with the axial arresting device in the extraction position of the sealing ring.
Figure 7:
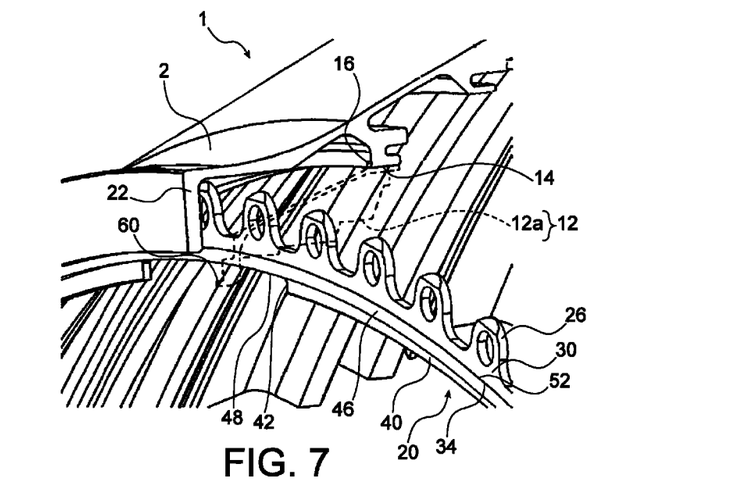
FIG. 7 shows a view similar to that in FIG. 4, with the axial arresting device in the position to extract the sealing ring.
Figure 8:
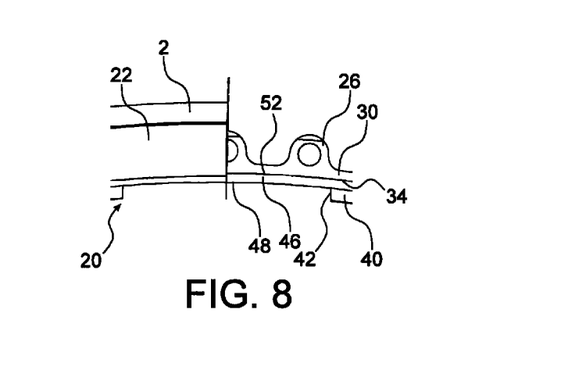
FIG. 8 shows a view similar to that in FIG. 5 with the axial arresting device in the position to extract the sealing ring.

With reference to FIGS. 6 to 8, the device 20 can be seen in the extraction position in which the low pressure turbine has been removed, and in which this axial arresting device 20 has been separated from the flange 22 by removal or loosening of the nuts 18. Nevertheless, the support 30 and the part 46 are still retained in the upstream direction by the casing flange 22 that extends inwards in the radial direction sufficiently, such that the device 20 cannot escape from the turbine. Consequently, it is captive.

Therefore the part 46 that is no longer clamped between the flange 22 and the rim 40 has easily been moved from its stop position to its extraction position, simply by rotating it about its axis 36. As mentioned above, in this position, the extraction passage 48 is off-centre and in particular releases part of the notch 42 of the rim 40. The retaining tab 60 of the ring 12 is no longer in contact with the part 46 at this notch, as can be seen better in FIG. 6 and in FIG. 7 in which the ring 12 has only been shown diagrammatically. Thus, the ring 12 is no longer axially bearing in contact with the stop part 46 around its entire periphery. In other words, at least one angular sector of the ring 12 located close to the notch 42 does not have any axial contact with the stop part 46, this angular sector having an inner radial end axially facing the extraction passage 48 and this notch 42.

Consequently, these ring sectors can be extracted one by one while keeping the rotor 8 in position, by sliding each sector forwards through the notch 42 and the eccentric part of the passage 48.

Obviously, the operations described above are done in the reverse order when the ring 12 has to be reassembled in the space between the casing 2 and the rotor 8.

Obviously, those skilled in the art can make various modifications to the invention as described above as non-limitative examples only.

The invention claimed is:

1. A device for axially arresting a sealing ring made of an abradable material that will come into contact with a periphery of a rotor of an aircraft turbomachine module, the device having a reference central first axis, the device comprising:
a support including a support opening defining a circular track centered on a second axis parallel to the first axis and at a distance from the first axis; and
an axial stop part including an extraction passage centered on a third axis parallel to the second axis and at a distance from the second axis, the axial stop part defining a complementary circular track around its periphery cooperating with the circular track of the support to allow the axial stop part to rotate relative to the support along the second axis, between an axial stop position for the sealing ring, and a position for extraction of the sealing ring through the extraction passage, a distance between the first and third axes being larger in the extraction position than in the axial stop position.

2. An axially arresting device according to claim 1, wherein a distance between the first and second axes is a same as a distance between the second and third axes.

3. An axially arresting device according to claim 1, wherein the extraction passage is generally circular in shape, centered on the third axis.

4. An axially arresting device according to claim 1, wherein the support opening includes an axial support rim for the axial stop part, the rim running along the circular track and projecting radially inwards from the circular track, and including a notch for extraction of the sealing ring.

5. An axially arresting device according to claim 1, wherein the support includes a festooned periphery centered on the first axis, dedicated to attachment of the support onto a casing of the turbomachine module.

6. An aircraft turbomachine module comprising:
a casing;
a rotor;
a sealing ring made of an abradable material in contact with the periphery of the rotor; and
an axial arresting device for axially arresting the sealing ring, the device having a reference central first axis, the device comprising:
a support including a support opening defining a circular track centered on a second axis parallel to the first axis and at a distance from the first axis; and
an axial stop part including an extraction passage centered on a third axis parallel to the second axis and at a distance from the second axis, the axial stop part defining a complementary circular track around its periphery cooperating with the circular track of the support to allow the axial stop part to rotate relative to the support along the second axis, between an axial stop position for the sealing ring, and a position for extraction of the sealing ring through the extraction passage, a distance between the first and third axes being larger in the extraction position than in the axial stop position.

7. A turbomachine module according to claim 6, wherein the first axis of the axial arresting device is coincident with a longitudinal axis of the turbomachine module.

8. A turbomachine module according to claim 6, wherein when in the axial stop position, the sealing ring is in axial bearing around 360° with the axial stop part, and when in the position for extraction of the sealing ring, at least one angular sector of the ring does not have any axial contact with the axial stop part, the angular sector having a radial inner end that is axially facing the extraction passage.

9. A turbomachine module according to claim 6, wherein the support opening includes an axial support rim for the axial stop part, and the axial stop part is axially squeezed between a flange of the casing and the axial support rim.

10. An aircraft turbomachine comprising:
   at least one module according to claim 6;
   means for attachment of the module onto another adjacent module, the attachment means also being used for attachment of the support onto the casing of the module.

\* \* \* \* \*